US005108186A

United States Patent [19]

Kipphan et al.

[11] Patent Number: 5,108,186

[45] Date of Patent: Apr. 28, 1992

[54] METHOD OF ESTABLISHING A MEASURING POINT FOR DETERMINING THE THICKNESS OF A LAYER OF DAMPENING MEDIUM ON AN OFFSET PRINTING PLATE; AND DEVICE FOR PERFORMING THE METHOD

[75] Inventors: Helmut Kipphan, Schwetzingen; Josef Haase, Neckargemünd; Werner Joss, Linkenheim, all of Fed. Rep. of Germany

[73] Assignee: Heidelberger Druckmaschinen AG, Heidelberg, Fed. Rep. of Germany

[21] Appl. No.: 497,490

[22] Filed: Mar. 22, 1990

[30] Foreign Application Priority Data

Mar. 22, 1989 [DE] Fed. Rep. of Germany ....... 3909401

[51] Int. Cl.$^5$ .............................. G01B 11/28

[52] U.S. Cl. .............................. 356/380; 356/381; 356/445; 356/448

[58] Field of Search .............................. 356/380-382, 356/445-446, 447, 448, 432-436; 250/559, 562, 563, 571, 572

[56] References Cited

U.S. PATENT DOCUMENTS

| | | | |
|---|---|---|---|
| 3,028,502 | 4/1962 | Schiffbauer et al. | 356/380 |
| 3,960,451 | 6/1976 | Wirz et al. | 356/382 |
| 4,259,590 | 3/1981 | Morris et al. | 356/380 |
| 4,441,819 | 4/1984 | Takeuchi et al. | 356/445 |
| 4,512,662 | 4/1985 | Tobias | 356/380 |
| 4,565,450 | 1/1986 | Wirz et al. | 356/446 |
| 4,573,798 | 3/1986 | Fujie et al. | 356/380 |
| 4,666,306 | 5/1987 | Matsumoto | 356/380 |
| 4,681,455 | 7/1987 | Jeschke et al. | 356/445 |
| 4,685,074 | 8/1987 | May et al. | 356/380 |
| 4,787,238 | 11/1988 | Seki et al. | 356/446 |
| 4,976,545 | 12/1990 | Kipphan et al. | 356/446 |
| 5,050,984 | 9/1991 | Kipphan et al. | 356/445 |

FOREIGN PATENT DOCUMENTS

| | | |
|---|---|---|
| 3636507 | 4/1988 | Fed. Rep. of Germany . |
| 3732934 | 4/1989 | Fed. Rep. of Germany . |

*Primary Examiner*—Richard A. Rosenberger
*Assistant Examiner*—Hoa Pham
*Attorney, Agent, or Firm*—Herbert L. Lerner; Laurence A. Greenberg

[57] ABSTRACT

A method of establishing a measuring location lying in an ink-free area for determining the thickness of a layer of dampening medium on the surface of an offset printing plate, which includes scanning the surface of the plate in a search run with a measuring head, and evaluating the thus obtained measurement data in a manner that a measuring location lies in a vertical zone of the offset printing plate with the smallest possible average area coverage, and a device for performing the method.

31 Claims, 4 Drawing Sheets

Fig. 1
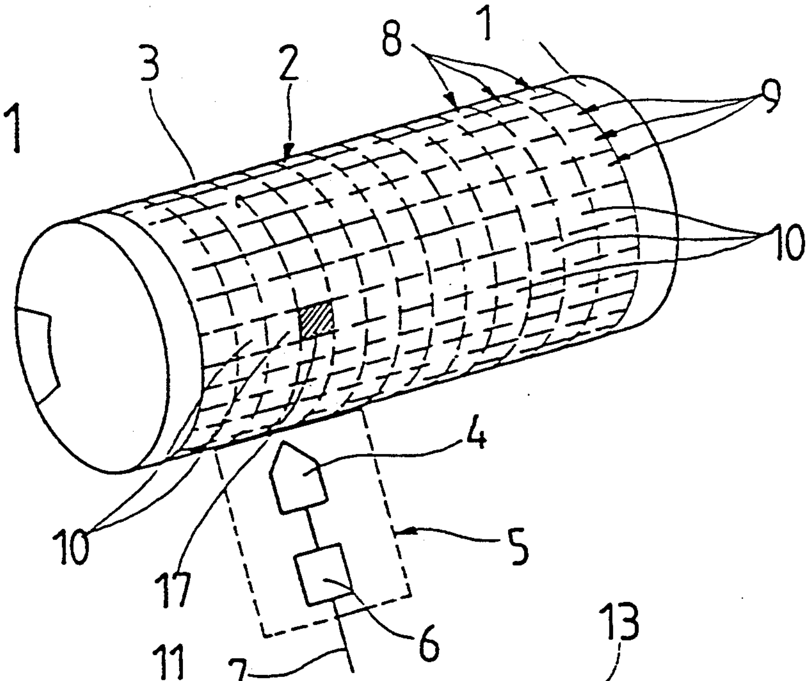
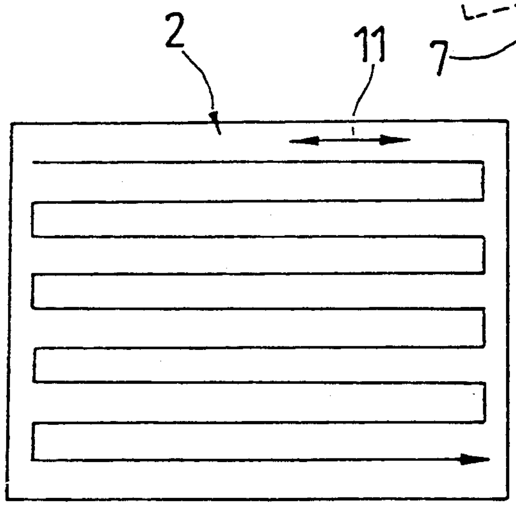
Fig. 2
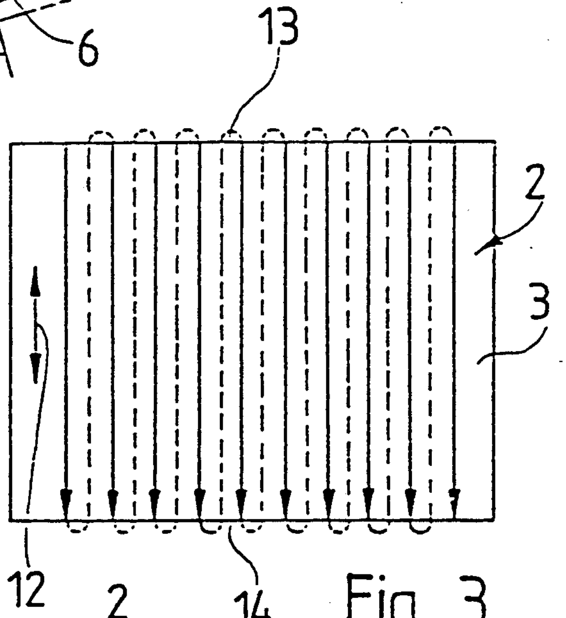
Fig. 3
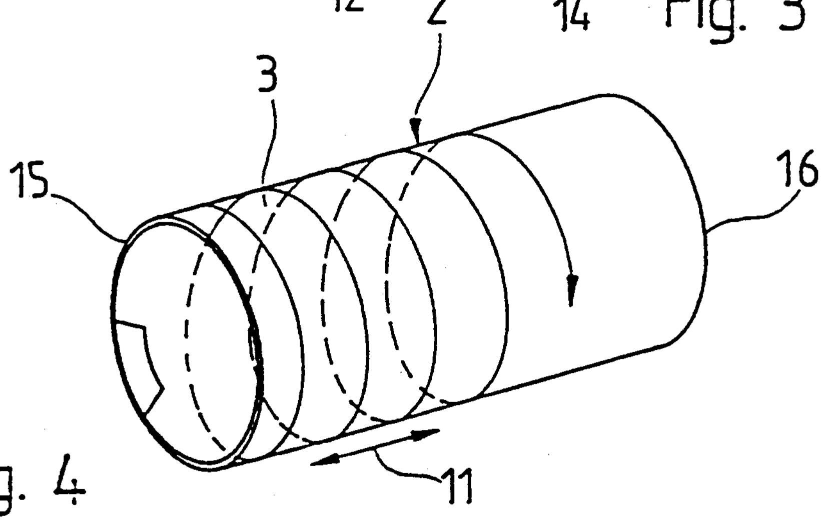
Fig. 4

METHOD OF ESTABLISHING A MEASURING POINT FOR DETERMINING THE THICKNESS OF A LAYER OF DAMPENING MEDIUM ON AN OFFSET PRINTING PLATE; AND DEVICE FOR PERFORMING THE METHOD

The invention relates to a method and device for establishing a measuring location or location lying in an ink-free area for determining the thickness of a layer of dampening medium on the surface of an offset printing plate and, more particularly, wherein a measuring head scans the surface of the plate in a search run, and an evaluation of the measurement data thus obtained is then performed.

A method of this general type has become known heretofore from German Published Non-Prosecuted Application (DE-OS) 36 36 507. wherein a measuring head performs search runs on a dampened offset printing plate during printing, in order to determine the distribution of the thickness of a layer of dampening medium and the quantity of dampening medium, respectively. After locating a critical zone corresponding to the printing conditions at that particular moment, a zone which is determined by the smallest quantity of dampening medium, at an image-free location, the measuring head is positioned thereat. The amount of dampening medium is thereupon regulated so that the given setpoint value is obtained at the determined position. If changes occur in the printing conditions, a new search run is triggered for a new critical zone, which may be available, after a given rest period. Constant monitoring of the entire surface of the plate must therefore take place. During the search run phase for the suitable measuring location, there is a risk of waste formation, because the regulation process is interrupted during this period.

German Published Non-Prosecuted Patent Application (DE-OS) 37 32 934 describes the recognition of printing or non-printing plate locations on an offset printing plate by means of the measuring head, and hence the automatic setting of the position of the measuring device on a non-printing plate area. The measurement is carried out by scanning the printing plate both in the direction of the circumference and in the direction of the plate cylinder axis.

It is accordingly an object of the invention to provide a method of the general type described in the introduction hereto which, without constant monitoring of the surface of the offset plates, permits an optimal establishment of a measuring location for a determination of the thickness of a layer of dampening medium.

With the foregoing and other objects in view, there is provided, in accordance with the invention, a method of establishing a measuring location lying in an ink-free area for determining the thickness of a layer of dampening medium on the surface of an offset printing plate, which comprises scanning the surface of the plate in a search run with a measuring head, and evaluating the thus obtained measurement data in a manner that a measuring location lies in a vertical zone of the offset printing plate with the smallest possible average area coverage. According to the invention, the measuring location can be established according to the aforementioned criteria even before the start of the actual printing process. A starting phase, only leading to the determination of the measuring location, as well as constant monitoring in order to locate critical zones and any possible change of the measuring location according to German Published Non-Prosecuted Application (DE-OS) 36 36 507. are thus avoided. According to the invention, the measuring location itself lies in an ink-free, i.e., image free area of the offset printing plate. However, the establishment of the measuring location is not performed solely by means of the automatic location of the ink-free area, but rather, all ink-free areas are examined with respect to their surroundings (neighboring areas). As the measuring location, that ink-free area is selected which lies with the smallest possible average area coverage in a vertical zone of the offset printing plate. This selection criterion ensures that the measuring location be located in an area of the offset printing plate which transfers relatively little ink, that is, the introduced dampening medium is essentially present in this area. Faulty measurements in the determination of the thickness of the layer of dampening medium occurring at the established measuring location in the subsequent printing process for determining the actual value for the regulation of the dampening medium are, in this way, virtually eliminated. A deposit of ink particles present in the dampening medium, which can occur in border areas and which can lead to erroneous or faulty determination of the actual value, during the feeding of the dampening medium, is avoided at the measuring location, which is located according to the invention, because of the aforementioned criterion.

It is preferable to install an optically-functioning measuring head having an illumination device which throws directed light at the surface of the offset printing plate via an illumination optical system. The light reflected from the printing plate is detected by a line of photoelectric diodes. The light radiation intensities determined at the individual photoelectric diodes of the line of diodes are processed in an evaluation unit. The evaluated data permit printing and non-printing areas, as well as their area coverage, to be recognized perfectly on the offset printing plate surface.

In accordance with another mode of the method according to the invention, the measuring location lies in an area with the smallest possible area coverage gradient in a horizontal direction of a horizontal zone. At both sides of each ink-free area lying in the vertical zone with the smallest average area coverage, the respective area coverage gradient in the horizontal direction is determined. The area coverage gradient determines the change in the area coverage along the path. The measuring location is then selected as the ink-free area having surroundings in the horizontal direction with the smallest possible area coverage gradient.

In accordance with a further mode of the method according to the invention, the measuring location lies in a area with the smallest possible area coverage gradient in vertical direction. Accordingly, the method, as already explained heretofore, is also performed in the vertical direction, so that the surroundings of each ink-free area which could be considered as a measuring location are preferably examined in all directions with regard to the area coverage gradient.

In accordance with an additional mode of the method according to the invention, the method includes performing the scanning of the plate surface with a measuring track width which is of like size as that of the width of the vertical and horizontal zone, respectively.

In accordance with an alternate mode of the method according to the invention, the method includes performing the scanning of the plate surface with a measuring track width which is smaller than the width of the vertical and horizontal zone, respectively. Accordingly, within a vertical and horizontal zone, respectively, several measuring tracks can lie adjacent and preferably parallel to one another.

In accordance with an added mode of the method according to the invention, the method includes clamping the offset printing plate to a plate cylinder of an offset printing machine, so that the vertical zone extends in the direction of the circumference, and the horizontal zone extends in the direction of the axis of the plate cylinder. The measuring location can therefore be located on the printing plate which is already clamped to the plate cylinder in the offset printing machine, before the start of the actual printing process. Preferably, the measuring head for determining the measuring position is the same device which also performs the detection of the thickness of the layer of dampening medium in the subsequent printing process. The outlay for equipment is thus kept small.

When the printing plate is already clamped to the plate cylinder, in accordance with yet another mode of the method according to the invention, the method includes displacing the measuring head by an axial path corresponding to the width of the vertical zone, after each revolution of the plate cylinder. With this method, consecutive and adjacent vertical zones of the offset printing plate, running in the direction of printing, are detected. The axial displacement is then preferably carried out when the measuring head is opposite the plate clamping channel of the plate cylinder. As indicated hereinbefore, depending upon the width of the measuring track of the measuring head and the selection of the width of the vertical zones, respectively, the entire appertaining vertical zone is already detected due to one revolution of the plate cylinder, or several adjacent measuring runs are necessary in order to scan the entire width of an appertaining vertical zone. In the case of several adjacent measuring tracks, an appropriate axial displacement of the measuring head is, of course, necessary after each revolution of the plate cylinder.

In accordance with yet a further mode of the method according to the invention, the method includes moving the measuring head continuously in the axial direction, while the plate cylinder simultaneously turns. Accordingly, the search run on the offset printing plate surface is along a helical path. As long as the axial path travelled during one revolution of the plate cylinder corresponds to the width of the field detected by the measuring head, scanning without gaps or omissions is assured. Due to the helical path, the individual measuring tracks are disposed at an inclination to the vertical direction of the offset printing plate. Because the individual measurement data are stored in a matrix, it is possible, however, during their evaluation, to read out, for example, only the measurement data for one vertical zone, that is, not to proceed along the inclined measuring track during the read-out process in the chronological sequence of the data input. A consequence thereof is that a more-or-less fictitious change in the direction of the measuring track occurs, in fact, from the direction which is inclined to the vertical, to the vertical direction.

In accordance with yet an additional mode of the method according to the invention, the method includes moving the measuring head continuously in the axial direction and, after each axial traversal of the plate cylinder, rotating the cylinder by an angular step.

In accordance with yet an added mode of the method according to the invention, the angular step corresponds to the width of the horizontal zone. Accordingly, horizontal zones and partial widths thereof, respectively, lying transversely to the direction of printing are detected consecutively by the measuring head.

In accordance with still another mode, the method according to the invention includes performing the search run several times, and averaging the measurement data for the same measuring location. In this way, a statistical protection of the measurement data is assured; any measurement error which might have occurred during one measuring run is then eliminated or is not so noticeable.

In accordance with still a further mode, the method according to the invention includes performing the several search runs with a measuring-track of given width slightly displaced from one another in each of the several search runs. This minimal displacement of two consecutive measuring tracks also reduces the possibility of an erroneous or faulty measurement; a virtual enlargement of the measuring zone more-or-less occurs. If, as described hereinbefore, several adjacent measuring tracks lie within one vertical and horizontal zone, respectively, a differential weighting of the individual measuring tracks can also take place, according to a further development of the invention, with a corresponding effect upon the result for the appertaining horizontal and vertical zone, respectively.

In accordance with still an additional mode of the method according to the invention, the method includes averaging the measurement data for a plurality of the measuring tracks located adjacent one another in the vertical and horizontal zone, respectively, over the width of the corresponding respective vertical and horizontal zone.

The method according to the invention presupposes an ink-free area for the establishment of the measuring location. In order to be able to decide whether the printed-subject surface of the offset printing plate has an ink-free area, a reference value is obtained by a measurement at the ink-free edge of the offset printing plate. If measurement data are obtained in the printed-subject surface which correspond to this reference value, an ink-free area may be assumed.

In accordance with still an added mode, the method according to the invention includes applying a Laplace operator (second derivation) on a vertical and/or horizontal area coverage sequences, for determining a location of the measuring location which lies in an area with the smallest possible change in the area coverage gradient.

Assuming an area coverage field $F_{D(x,y)}$, the following is obtained for the gradient of the area coverage field:

$$\nabla F_D(x,y) = \begin{bmatrix} \frac{\partial F_D}{\partial x} \\ \frac{\partial F_D}{\partial y} \end{bmatrix}$$

wherein x represents the vertical, and y the horizontal coordinate direction.

$$\nabla^2 F_D = \text{minimal}$$

Image locations (surface rotation zero) with minimal area-coverage change are found by using the equation: with $$\nabla^2 F_D = \frac{\partial^2 F_D}{\partial x^2} + \frac{\partial^2 F_D}{\partial y^2}$$

$\nabla^2$ is the Laplace operator.

In the case of a digital field for area coverage, and on the basis of surroundings of an area coverage field FD (i,j) which encompass a 3×3 area coverage element;

$$\nabla^2 F_D(i,j) = [F_D(i+l,j) + F_D(i-l,j) + F_D(i,j+1) + F_D)i,j-1)] - 4F_D(i,j).$$

wherein i and j are counting indices in the vertical and horizontal direction, respectively.

Due to the described evaluation of the area coverage sequence, assurance is provided that there are no heavily-inked image locations in the surroundings of the measuring location, which could have any effects upon the precise determination of the actual value of the thickness of the layer of dampening medium.

In accordance with another aspect of the invention, there is provided, a method of establishing a measuring location lying in an ink-free zone for determining the thickness of a layer of dampening medium on the surface of an offset printing plate, which comprises scanning with a measuring head the surface of the plate in a search run so as to determine a matrix of the area coverage on the offset printing plate, and evaluating measurement data thus obtained in such a manner that a measuring location lies in a vertical zone with smallest possible average area coverage, and that neighboring areas of the measuring location have a smallest possible area coverage gradient in horizontal direction and vertical direction. This results in the establishment of the measuring location in an ink-free area, having neighboring areas with the smallest possible inking or ink feed and the smallest possible change in inking. The average area coverage of the individual vertical zones is found there by forming averages from the measurement data determined in the individual vertical zones. An average area coverage profile thereby be determined transversely to the direction of printing, by means of combining the individual vertical zone values. If several vertical zones feature an equally small average area coverage, the selection of the vertical zone to be obtained for the subsequent procedure is performed by observing the respective, mutually adjacent neighboring zones with respect to the smallest possible average area coverage gradient lying transversely to the direction of printing.

In accordance with another mode, the method according to the invention includes, in the absence of an ink-free area of a printed subject surface, selecting a location for the measuring location on an ink-free edge of the offset printing plate. Following the teaching of the invention, the zone of the printed-subject surface adjacent to the marginal area is examined for the smallest possible average area coverage, and preferably also for the smallest possible area coverage gradient.

The method according to the invention can also be implemented outside of the offset printing machine. For example, the evaluation of the matrix records by plate scanners offers the possibility of defining a measuring location according to the aforementioned criteria. In particular, the CPC-3 system marketed by Heidelberger Druckmaschinen A.G. can be used. 22×32 area-coverage matrix values are available. The evaluation of this area-coverage matrix is then performed in accordance with the aforementioned procedure. Accordingly, from the matrix of the area coverage values, an ink-free location can be established, for example in a zone of small average area coverage, in the surroundings of which the area coverage gradient changes only slightly. The data which is obtained can be stored, for example, on cassettes, in order to determine automatically the measuring position of a sensor detecting the thickness of the layer of dampening medium, after the data have been entered in the machine control panel of the offset printing machine.

If, in the performance of a printing operation, the individual ink zone apertures of the inker unit of the offset printing machine have already been established, these can be used instead of determining the vertical zone with the smallest area coverage. The vertical zone which is assigned to the smallest ink zone aperture is used as the selected vertical zone. Thus, after establishment of this vertical zone, the determination of the adjacent ink zone gradients can then be continued.

The procedure described hereinbefore leads to an automatic establishment of the measuring location and positioning of the sensor for determining the thickness of the layer of dampening medium. In accordance with an alternate mode of the method according to the invention, which includes inputting coordinates of the measuring location from a machine control panel of the offset printing machine by an operator using a specimen sheet of a print. In this way, it is possible for the operator merely to provide the coordinates of the measuring location found by automatic evaluation (e.g. plate scanner). The specimen sheet is used for orientation.

In accordance with a further mode, the method according to the invention includes performing by an operator a visual evaluation of the printing plate or of the specimen so that a measuring location located in an ink-free area lies in a zone with the smallest possible average area coverage. This means that no sensor evaluation is performed, but rather that the operator applies the evaluation criteria according to the invention by means of visual assessment. In accordance with an additional mode of the method according to the invention, the method includes determining the measuring location by means of the visual evaluation in an area which has a smallest possible area coverage gradient in the horizontal direction and/or vertical direction. If the operator has selected the measuring location by means of visual evaluation, its coordinates must be obtained and inputted into the offset printing machine via the control panel, so that the sensor for the thickness of the layer of dampening medium can move to this location. In accordance with an added mode of the method according to the invention, the method includes projecting a light half-tone screen on the printing plate or the specimen sheet, and determining by an operator coordinates of the measuring location through the use of the half-tone screen.

In accordance with yet another mode, the method according to the invention includes inputting the coordinates of the measuring location through an extension of a table accommodating the offset printing plate and formed as a digitized tablet (touch-panel). The selected measuring location is thereby transmitted to the offset printing machine simply by travelling to the selected location (touch-panel).

In accordance with yet a further mode, the method according to the invention includes determining the measuring location on a dry offset printing plate.

In accordance with an alternative mode, the method according to the invention includes determining the measuring location on a dampened offset printing plate. The latter alternative is always possible when the installed measuring head is not adversely affected by the presence of the layer of dampening medium in the evaluation of the area coverage.

In order not to obtain any falsification of the measurement values by passing over the plate clamping channel of the plate cylinder, in accordance with yet an additional mode, the method according to the invention includes triggering (starting) the scanning with the measuring head for each plate-cylinder revolution, at a beginning of the offset plate for each plate-cylinder revolution, due to a plate clamping channel of the plate cylinder, and interrupting the scanning at an end of the offset plate.

In accordance with another aspect of the invention, there is provided a device for establishing a measuring location lying in an ink-free area for determining the thickness of a layer of dampening medium on the surface of an offset printing plate, comprising a measuring head for scanning the plate surface and deriving measurement data therefrom, evaluating means for processing the measurement data derived by said scanning head and evaluating the measurement data in a manner that a measuring location lies in a vertical zone of the offset printing plate with a smallest possible average area coverage.

In accordance with a concomitant aspect of the invention, there is provided a device for establishing a measuring location lying in an ink-free area for determining the thickness of a layer of dampening medium on the surface of an offset printing plate, comprising a measuring head for scanning the plate surface and deriving measurement data therefrom, evaluating means for evaluating the measurement data in a manner that a measuring location lies in a vertical of the offset printing plate with a smallest possible average area coverage and in an area with a smallest possible area coverage gradient in a horizontal direction and/or a vertical direction.

If a multi-color offset printing machine is used, the establishment of the measuring location is performed on each printing unit. In so doing, it can be the basic rule that the measuring locations on the various plates corresponding to color sections do not agree with one another.

Other features which are considered as characteristic for the invention are set forth in the appended claims.

Although the invention is illustrated and described herein as embodied in a method of establishing a measuring location for determining the thickness of a layer of dampening medium on an offset printing plate; and device for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic perspective view of a plate cylinder provided with an offset printing plate;

FIG. 2 is a plane projection of an offset printing plate removed from the plate cylinder with an illustration of a search run path of a measuring head;

FIG. 3 is a view like that of FIG. 2 with a different search run path of the measuring head;

FIG. 4 is a diagrammatic perspective view of an offset printing plate having a form found on a plate cylinder, and illustrating a further possible search run path;

Figure 6:
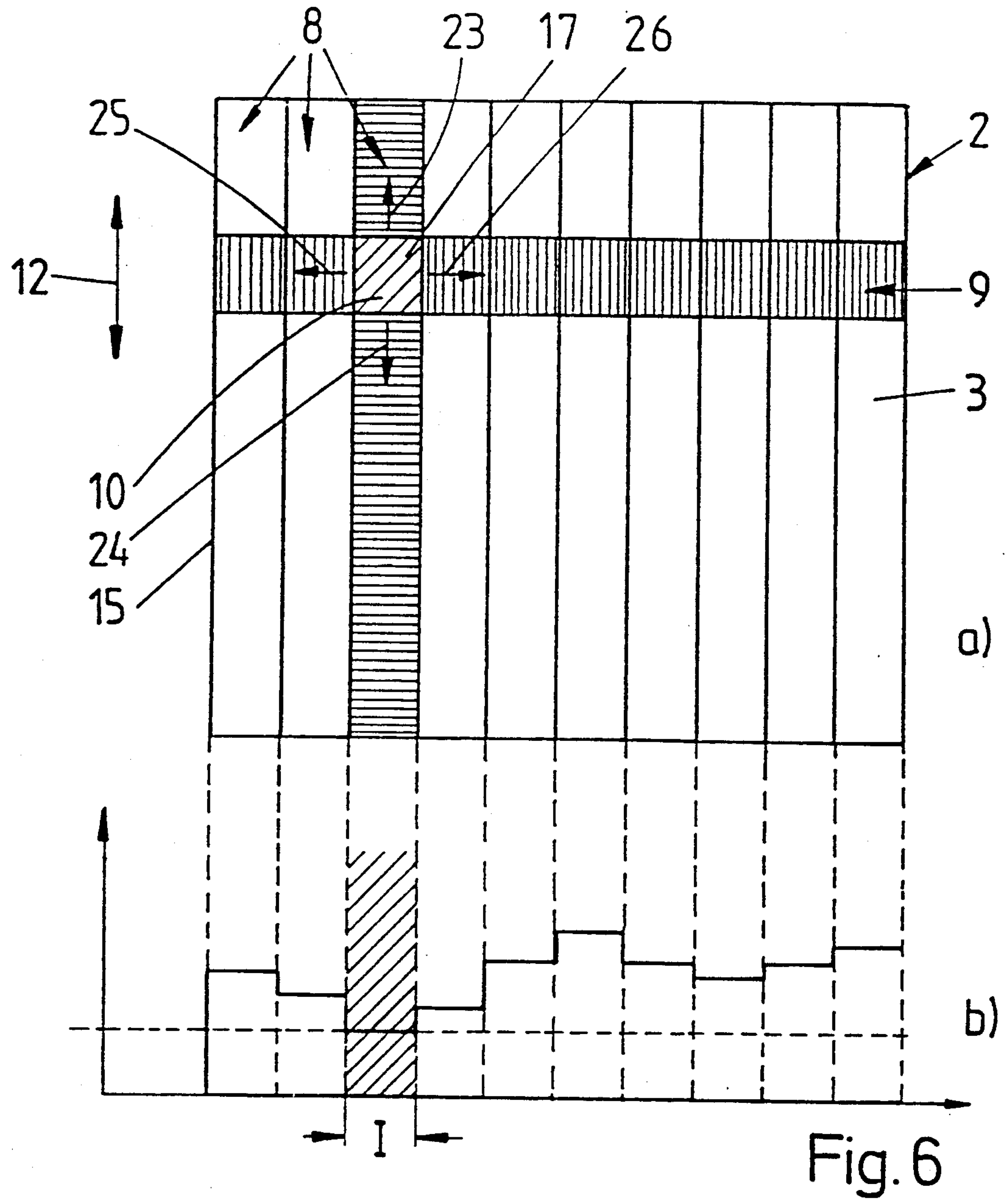
Figure 7:
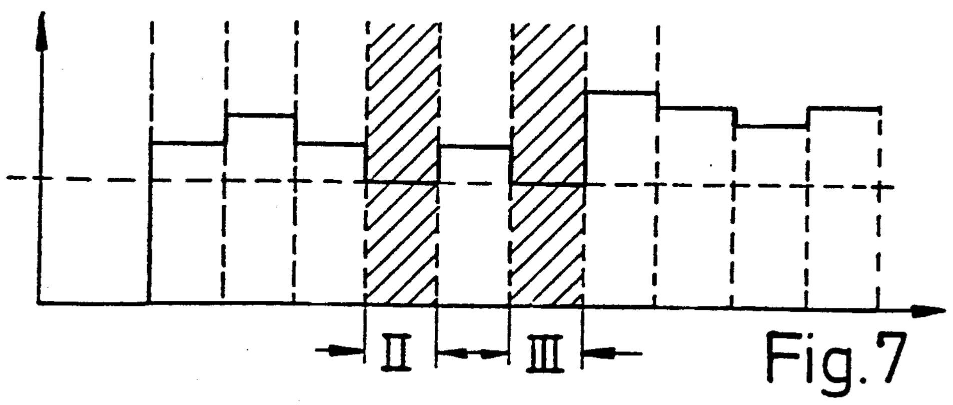
Figure 8:
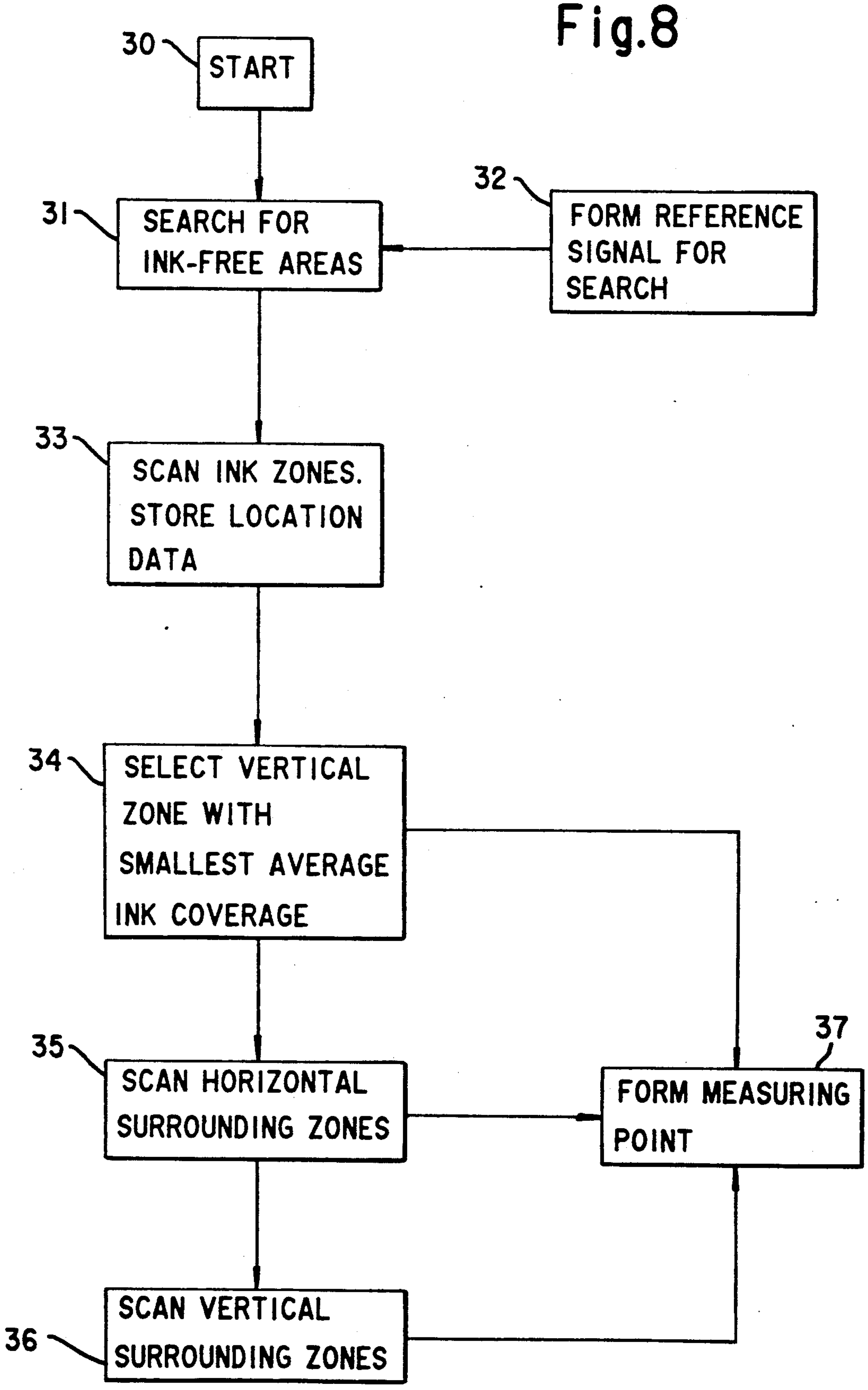

FIGS. 6*a* and 6*b* are, respectively, a top plan view of an offset printing plate with vertical zones, indicated thereon, and a plot diagram showing the size of the average area coverage in the individual vertical zones;

FIG. 7 is a plot diagram like that of FIG. 6*b* wherein there is like average area coverage present in two vertical zones; and FIG. 8 is a flow chart of the method according to the invention.

Referring now to the drawing and, first, particularly to FIG. 1 thereof, there is shown therein diagrammatically a plate cylinder 1 of a printing unit of an offset printing machine. An offset printing plate 2 is secured on the plate cylinder 1. The surface 3 of the offset printing plate 2 is optically scanned by a measuring head 4 of a measuring device 5, such as is described in the aforementioned German Published Non-Prosecuted Application (DE-OS) 37 32 934, which includes an evaluation unit 6. The output 7 of the evaluation unit 6 is connected with a non-illustrated, conventional regulating device of the offset printing machine, with the aid of which the thickness of the layer of dampening medium present on the surface 3 of the offset printing plate 2 is regulated with respect to a given setpoint value during the printing process.

As indicated in FIG. 1, the surface 3 of the offset printing plate 2 is subdivided into a number of vertical zones 8 and a number of horizontal zones 9. The rectangular areas 10 resulting therefrom represent the respective coverage of the measuring head 4.

In order to be able to establish a measuring location 17 for the determination of the thickness of the layer of dampening medium on the surface 3 of the offset printing plate 2 for a subsequent printing process in accordance with the invention, the offset printing plate 2 is initially scanned in the search run of the measuring head 4. This can be effected in different ways;

Thus, FIG. 2 is a diagrammatic view of an offset printing plate 2, imaginarily removed from the plate cylinder 1, and flattened out, and subjected to a search run, in accordance with the invention, wherein the measuring head 4 initially moves continually in axial direction as represented by the double-headed arrow 11, i.e., in the direction of the horizontal zones 9 and, after each axial traversal of the plate cylinder 1, is turned by an angular step corresponding to the width of the horizontal zone 9, so that the meander-shaped search run path indicated in FIG. 2 is obtained.

FIG. 3 shows another, preferred search run. In this regard, too, an offset printing plate 2 is represented as being imaginarily removed from the plate cylinder 1, i.e., it is then in a projected or flattened form. The search run begins, for example, in the upper left-hand corner of the offset printing plate 2, and leads in a vertical direction represented by the double-headed arrow 12 from the upper edge of the plate 13 to the lower edge 14. This takes place as a result of the rotation of the plate cylinder 1. After each rotation, the measuring head 4 is displaced by an axial path corresponding to the width of the respective traversed vertical zone 8. This is indicated in FIG. 3 by dotted lines.

Finally, yet another possibility for guiding the measuring head is apparent from FIG. 4. In this regard, the measuring head 4 is moved continuously in the axial direction 11 from edge 15 of the plate 2 to the other plate edge 16, while the plate cylinder 1 rotates simultaneously. For a clearer understanding, FIG. 4 shows the offset printing plate 2 in a configuration wherein it is clamped to the plate cylinder 1. This described procedure results in a scanning of the surface 3 of the offset printing plate 2 along a helical line.

In order to implement the method according to the invention, the following occurs:

Before the actual printing process begins, the offset printing plate 2 is secured on the plate cylinder 1, in accordance with FIG. 1. Then, the preferably dry surface 3 of the offset printing plate 2 is scanned (traversed) by the measuring head 4 in accordance with one of the possible search runs mentioned hereinbefore (FIGS. 2 to 4). The measuring device 5 is provided, for this purpose, with an illumination device, not shown in greater detail, which throws a light directed via an illumination optical system onto the surface 3 of the offset printing plate 2. The light reflected by the offset printing plate 2 is detected by the measuring head 4 and guided to a line of photoelectric diodes located therein. From the intensities of radiation registered at the individual photoelectric diodes of the photoelectric diode line, corresponding measurement data can be derived. These are fed to the evaluation unit 6 and processed there. The measurement device 5 affords a determination of the surface structure of the offset printing plate 2 with respect to printing and non-printing sections. In the case of the printing sections, a decision can be made, in accordance with the reflected light, about the area coverage present on a subsequent printed product, i.e., concerning the inking or ink feed. By "area coverage" there is meant the percentage of the surface which is covered with printing ink within a determined grid field (ratio of the printing area to the non-printing area in a grid field). Overall, the procedure is such that, during a search run by the measuring head 4 over the entire surface 3 of the offset printing plate 2, corresponding measurement data are fed to the evaluation unit 6 and stored there.

An evaluation of the stored data is then performed with a computer program, in order to establish at least one measuring location 17 on the surface 3 of the offset printing plate 2 at which the thickness of the layer of dampening medium is measured during the subsequent printing process, in order to obtain the actual value there for the aforedescribed regulation procedure.

Figure 5:
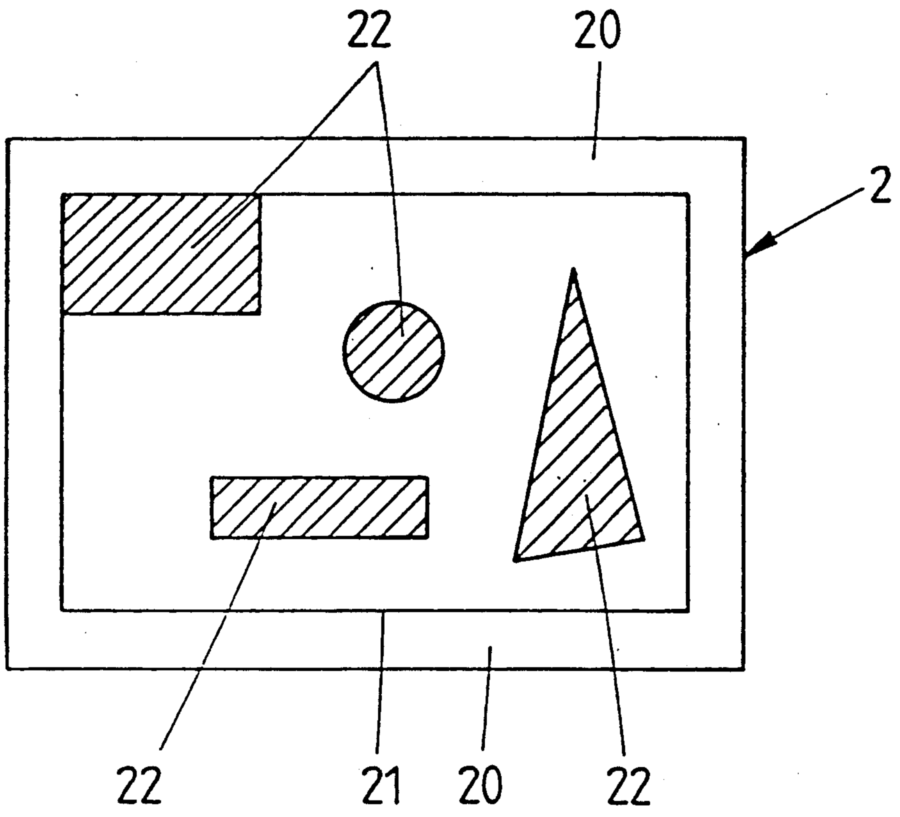
FIG. 5 is a top plan view of an offset printing plate.

The establishment of the measuring location 17 occurs in accordance with criteria of the invention:

Initially, the measuring head 4 searches the surface 3 of the offset printing plate 2 for ink-free areas. In order to recognize the latter, the measuring head 4 forms a reference value by traveling to the ink-free edge of the offset printing plate 2. If an area of the printed subject of the offset printing plate 2 has measurement data corresponding to the reference value, then that area is free of ink. For a clearer understanding, FIG. 5 is a top plan view of the offset printing plate 2. The print-free edge is identified by reference numeral 20. This borders or surrounds the printed surface 21 (printed subject). Additionally, inking areas 22 (full tone or half-tone screen areas) are represented. That area which is ink-free and non-printing, respectively, and fulfills certain criteria according to the invention is established as the measuring location 17 for the determination of the thickness of the layer of dampening medium. These criteria are as follows:

In the vertical direction 12, i.e., within one of the vertical zones 8, as small an average area coverage as possible must be present; therefore, only a very small amount of inking must be present therein.

In addition to this condition, in accordance with another mode of the method according to the invention, areas neighboring the ink-free area provided as the measuring location, in vertical and/or horizontal direction, must respectively have as small an area coverage gradient as possible, i.e., areas must be present which feature the smallest possible change in inking. Overall, assurance is provided that, around the ink-free area to be chosen as the measuring location, the smallest possible inking or change in inking, respectively, exists so that the supply of dampening medium is not "disrupted" by the presence at close proximity of large proportions of ink, which could cause a falsification of the measurement values.

In a preferred mode of the method invention, the measuring head 4, to register measurement data, is moved in the axial direction 11 from one edge 15 of the plate 2 to the other edge 16 of the plate 2, while the plate cylinder 1 turns simultaneously. For a clearer understanding, FIG. 4 shows the offset printing plate 2 in a corresponding configuration wherein it is clamped to the plate cylinder 1. This described procedure results in a scanning of the surface 3 of the offset printing plate 2 along the helical line. As long as the axial displacement after each revolution corresponds to the width of one vertical zone 8, an uninterrupted search run is performed.

FIGS. 6, 7 and 8 again clarify the method according to the invention. Initially, the surface 3 of the offset printing plate 2 is scanned in the vertical direction 12, i.e., along the vertical zones 8, by means of the measuring head 4. According to the particular construction of the device for performing the method, this can occur on the flattened offset printing plate 2 or, however, also when it is in its curved state when clamped to the plate cylinder 1. The measurement values recorded by scanning the vertical zones 8, which have individual ink-free areas, are fed to the evaluation device 6, which determines an average area coverage therefrom for each vertical zone 8. By "average area coverage" there is meant the average value of area coverage of the respective appertaining vertical zone 8. According to the invention, only that vertical zone 8 is selected which features the smallest average area coverage. FIG. 6*a* shows that the measurement location 17 lies in the third vertical zone 8 from the left-hand side of the figure. The measuring location 17 itself represents an ink-free area 10. In the diagram 6*b*, the related average area coverages in each case are plotted against the individual vertical zones 8. Starting from the plate edge 15, the average area coverage decreases in stages until, in area I, the smallest average area coverage is present. Then, the average area coverage increases again. The vertical zone 8 designated "I" is accordingly selected. As described, according to another mode of the method invention, the surroundings of the measuring location 17 are provided with the smallest possible area coverage gradient. In this respect, the vertical and horizontal zone emanating from the measuring location 17 can be examined. This is illustrated in FIG. 6*a*. Starting from the ink-free area 10, the surroundings are examined in the vertical direction (arrows 23 and 24) and in the horizontal direction (arrows 25 and 26) with respect to the change in the area coverage (area coverage gradient). In this regard, the respective area coverage gradient along the corresponding vertical-zone and horizontal-zone sections is determined. If the respective area coverage gradient is small, then the area 10 can be selected as the measuring location 17.

FIG. 7 is a plot diagram corresponding to that of FIG. 6*b*. It is assumed that the average area coverage in two vertical zones 8 having ink-free areas, namely, in areas II and III, is of equal size, these two values representing the lowest values. If the neighboring zones of area II are then observed, it will be noted that the average area coverage there is smaller than with respect to area III because in the latter case, the vertical zone 8 lying to the right-hand side thereof has a considerable average area coverage value.

Correspondingly, in accordance with the method of the invention, the area II is used as the selected vertical zone 8 and, as described hereinbefore, an ink-free area is then determined therein as the measuring location 17.

The described measurement can also be performed outside the offset printing machine, by placing the flattened offset printing plate 2 on a measuring table and then traversing it with the measuring head 4. Preferably, a printing plate scanner is used. Thus, a matrix is recorded for the area coverage structure. The evaluation of the area coverage matrix then takes place analogously to the foregoing procedure.

With respect to the aforementioned method by which the average area coverages are obtained, information can also be given insofar as it is known, via the ink zone apertures. If, in axial direction, the ink zone apertures for the subsequent printing process of a printing unit are known, then that vertical zone which has the smallest ink zone aperture can be equated to the ink zone with the smallest average area coverage. This means that the vertical zone thus presented is selected. The procedure then is that the measuring head is positioned in this selected zone with minimal ink-zone aperture, and a measurement is performed for the neighboring zones with respect to the smallest possible change in area coverage around an ink-free area.

The selection of the measuring location can also be performed in a relatively simple manner by the printer. This takes place, for example, outside of the offset printing machine. It is advantageous if the position of the measuring location is established by means of a grid projected by an optical system. The coordinates of this measuring location can then be fed by the printer to the offset printing machine by means of the keyboard, so that the measuring head of the offset printing machine provided for the measurement of thickness of the layer of dampening medium can travel to a corresponding position for the measurement during the subsequent printing process. As an alternative, it is also possible, however, for the measuring location found on the flattened offset printing plate located outside of the offset printing machine to be communicated to the measuring head on the printing machine by means of data transmission, a special measuring table extension being provided in the form of a digitizing table outside of the machine. This enables the realization of a half-tone screen field, so that the appertaining local data are transmitted to the printing machine in digitized form, and they trigger an automatic position adjustment of the measuring head for the determination of the thickness of the layer of dampening medium there.

In FIG. 8, a flow chart of the method according to the invention is shown. It begins with a block 30, which incorporates the start. Then, in block 31, the search for ink-free areas on the offset printing plate 2 occurs. In block 32, a reference signal is formed for this purpose. This occurs by scanning the ink-free edge of the offset printing plate 2. If measurement data from the surface of the printed subject correspond to the reference signal, it can be assumed that there are ink-free areas. Block 33 incorporates the scanning of the vertical and horizontal zones 8 and 9, respectively. The measurement data obtained are stored. According to block 34, the vertical zone with the smallest average area coverage is selected by means of appropriate evaluation. A prerequisite thereof is that this vertical zone 8 have at least one ink-free area 10. This ink-free area 10 then forms the measuring location, according to block 37. However, according to a further mode of the method according to the invention, the horizontal surroundings (block 35) and/or the vertical surroundings (block 36) of the selected ink-free area 10 can also be examined for the smallest possible area coverage gradient.

The foregoing is a description corresponding in substance to German Application P 39 09 401.4, dated Mar. 22, 1989, the International priority of which is being claimed for the instant application, and which is hereby made part of this application. Any material discrepancies between the foregoing specification and the aforementioned corresponding German application are to be resolved in favor of the latter.

We claim:

1. Method of establishing a measuring location lying in an ink-free area for determining the thickness of a layer of dampening medium on the surface of an offset printing plate, which comprises scanning the surface of the plate in a search run with a measuring head in a vertical measuring zone, and evaluating the thus obtained measurement data and determining that a measuring location lies in the vertical measuring zone of the offset printing plate with the smallest possible ink average area coverage.

2. Method according to claim 1, wherein the measuring location lies in an area with a the smallest possible ink area coverage gradient in a horizontal direction measuring zone.

3. Method according to claim 2, wherein the measuring location lies in an area of said horizontal measuring zone with the smallest possible ink area coverage in a vertical direction.

4. Method according to claim 2, which includes performing the scanning of the plate surface with a measuring track width which is of like size as that of the width of the vertical measuring zone and horizontal measuring zone respectively.

5. Method according to claim 2, which includes performing the scanning of the plate surface with a measuring track width which is smaller than the width of the vertical measuring zone and horizontal measuring zone, respectively.

6. Method according to claim 2, which includes clamping the offset printing plate to a plate cylinder of an offset printing machine, so that the vertical measuring zone extends in the direction of the circumference of the plate cylinder, and the horizontal measuring zone extends in the direction of the axis of the plate cylinder.

7. Method according to claim 6, which includes displacing the measuring head by a predetermined axial path, after each revolution of the plate cylinder.

8. Method according to claim 6, which includes displacing the measuring head by an axial path corresponding to the width of the vertical measuring zone, after each revolution of the plate cylinder.

9. Method according to claim 6, which includes moving the measuring head continuously in the axial direction, while the plate cylinder simultaneously turns.

10. Method according to claim 6, which includes moving the measuring head continuously in the axial direction and, after each axial traversal of the plate cylinder, rotating the cylinder by an angular step.

11. Method according to claim 10, wherein the angular step corresponds to the width of the horizontal zone.

12. Method according to claim 11 which includes performing the several search runs with a measuring track of given width slightly displaced from one another in each of the several search runs.

13. Method according to claim 12, which includes averaging the measurement data for a plurality of the measuring tracks located adjacent one another in the vertical measuring and horizontal measuring zone, respectively, over the width of the corresponding respective vertical and horizontal zone.

14. Method according to claim 6, which includes triggering (starting) the scanning with the measuring head for each plate-cylinder revolution, at a beginning of the offset plate for each plate-cylinder revolution, due to a plate clamping channel of the plate cylinder, and interrupting the scanning at an end of the offset plate.

15. Method according to claim 2, which includes applying a Laplace operator on vertical and/or horizontal area coverage sequences, for determining the position of the measuring location which lies in an area with the smallest possible change in the ink area coverage gradient.

16. Method according to claim 1 which includes performing the search run several times, and averaging the measurement data for the same measuring location.

17. Method according to claim 1 which includes performing a measurement at the ink-free edge of the offset printing plate, and obtaining from the measurement a reference value for the measuring location located in a printed subject.

18. Method according to claim 1, which includes determining the measuring location on a dry offset printing plate.

19. Method according to claim 1, which includes determining the measuring location on a dampened offset printing plate.

20. Method of establishing a measuring location lying in an ink-free zone for determining the thickness of a layer of dampening medium on the surface of an offset printing plate, which comprises scanning with a measuring head the surface of the plate in a search fun for determining a matrix of the ink area coverage values on the offset printing plate, and evaluating measurement data thus obtained and determining that a measuring location lies in a vertical measuring zone with a smallest possible average ink area coverage, and that neighboring areas of the measuring location have a smallest possible ink area coverage gradient in horizontal direction and vertical direction.

21. Method according to claim 20, which includes, in the absence of an ink-free area of a printed subject surface, selecting the measuring location on an ink-free edge of the offset printing plate.

22. Method according to claim 20, which includes, in order to establish the measuring location, determining the matrix of the ink area coverage values of the offset printing plate by means of a printing plate scanner equipped with a measuring head, and then evaluating the matrix of the ink area coverage values.

23. Method according to claim 20, which includes, in order to determine the vertical measuring zone with the smallest average ink area coverage, using a corresponding ink zone aperture of the ink unit of the offset printing machine.

24. Method according to claim 23, wherein utilizing the ink zone aperture is exclusive of apertures at edge zones.

25. Method according to claim 20, which includes inputting matrix coordinates of the measuring location into a machine control panel of the offset printing machine by an operator.

26. Method according to claim 25, which includes performing by an operator a visual evaluation of one of the printing plate or of the specimen to determine a measuring location in an ink-free area in a measuring zone with the smallest possible average ink area coverage.

27. Method according to claim 26, which includes determining the measuring location by means of the visual evaluation in an area which has a smallest possible ink area coverage gradient in the horizontal direction and/or vertical direction.

28. Method according to claim 25, which includes projecting a light half-tone screen on one of the printing plate or the specimen sheet, and determining by an operator coordinates of the measuring location through the use of the half-tone screen.

29. Method according to claim 20, which includes inputting the coordinates of the measuring location through an extension of a table accommodating the offset printing plate and formed as a digitizing table.

30. Device for establishing a measuring location lying in an ink-free area for determining the thickness of a layer of dampening medium on the surface of an offset printing plate, comprising a measuring head for scanning the plate surface and deriving measurement data therefrom, evaluating means for processing the measurement data derived by said scanning head and evaluating the measurement data for determining that a measuring location lies in a vertical zone of the offset printing plate with a smallest possible average ink area coverage.

31. Device for establishing a measuring location lying in an ink-free area for determining the thickness of a layer of dampening medium on the surface of an offset printing plate, comprising a measuring head for scanning the plate surface and deriving measurement data therefrom, evaluating means for evaluating the measurement data and determining that a measuring location lies in a vertical measuring zone of the offset printing plate with a smallest possible average ink area coverage and in an area with a smallest possible ink area coverage gradient in at least one of a horizontal direction or a vertical direction.

* * * * *